PLATE MAKING APPARATUS

Filed Nov. 8, 1962

2 Sheets-Sheet 1

INVENTORS
WALTER WANIELISTA
CHARLES R. SIPPEL JR.
BY
Hill, Sherman, Meroni, Gross & Simpson
ATTORNEYS INVENTORS
WALTER WANIELISTA
CHARLES P. SIPPEL JR.
BY
Hill, Sherman, Meroni, Gross & Simpson
ATTORNEYS United States Patent Office 3,180,242

Patented Apr. 27, 1965

3,180,242
PLATE MAKING APPARATUS

Walter Wanielista, Westchester, and Charles P. Sippel, Jr., Villa Park, Ill., assignors to Robertson Photo-Mechanix, Inc., Chicago, Ill., a corporation of Illinois Filed Nov. 8, 1962, Ser. No. 236,237
7 Claims. (Cl. 95—76)

This invention relates to improvements in plate making apparatus and more particularly concerns improvements in that type of unit wherein a photosensitive plate such as employed in the printing trade is adapted to be conveniently supported for exposure to an image on a negative plate by the projection of intense illumination accompanied by substantial heat.

In a typical apparatus of this type, a printing frame has a platen which forms a vacuum bed holding thereagainst a photosensitive plate upon which is superposed a negative which is held against the plate while the frame is swung up into a vertical exposure position wherein intense illumination as from arc lamps is impinged upon the assembly to effect the necessary exposure. Such illumination is accompanied by substantial heat which tends to affect the assembly and more particularly the plate and negative deleteriously.

An important object of the present invention is to provide for the protection of plate making apparatus from overheating during photo-exposure.

Another object of the invention is to provide for the efficient air cooling of plate making apparatus.

A further object of the invention is to provide new and improved means for air cooling the platen and supported assembly of plate making elements in a highly efficient manner on both the back and front side of the platen.

A still further object of the invention is to provide new and improved means for selectively directing cooling air to one side of a platen in a plate making apparatus.

Other objects, features and advantages of the present invention will be readily apparent from the following detailed description of an exemplary embodiment thereof taken in conjunction with the accompanying drawings, in which.

In one type of printing, plates are photographically produced by subjecting a photosensitive flexible sheet of material to exposure of strong light while holding a negative superimposed on the photosensitive surface of the plate, and then processing the plate. One such process is known as the Dycril process.

Figure 1:
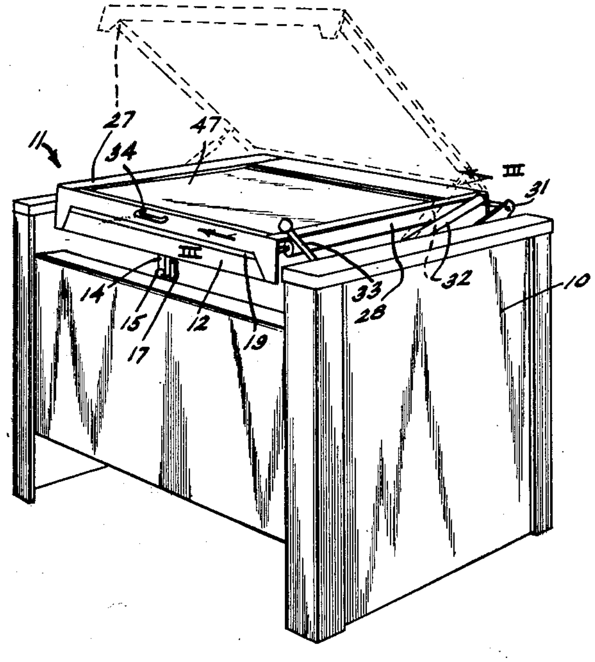
FIGURE 1 is a perspective view of apparatus embodying features of the invention, showing the same with the exposure frame in a horizontal loading position.
Figure 2:
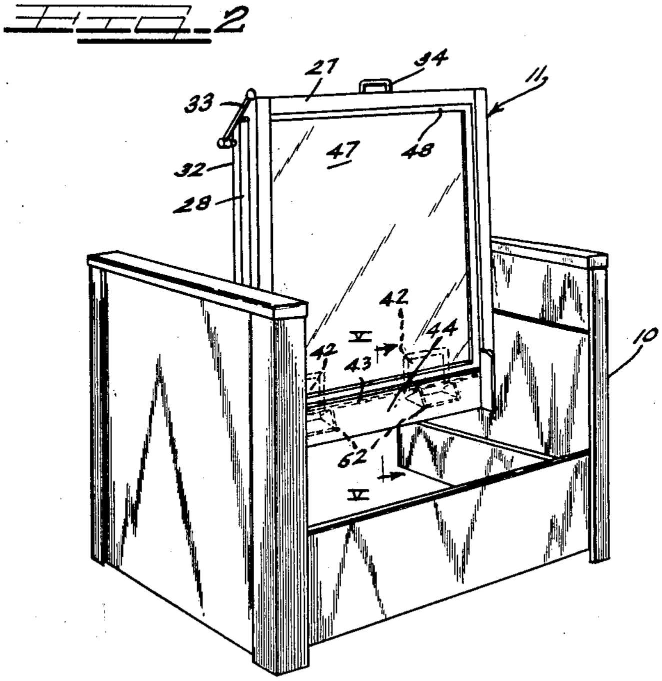
FIGURE 2 is a perspective view of the apparatus showing the exposure frame in vertical exposure position.

Exposure of the photosensitive printing plates is adapted to be effected in a plate making apparatus unit as disclosed in FIGURES 1 and 2 including a cabinet-like supporting structure stand 10 pivotally supporting a printing or exposure frame 11 adapted to be positioned horizontally as shown in FIGURE 1 for loading purposes and to be swung into a vertical position as shown in FIGURE 2 for exposure purposes, that is, to subject a photosensitive plate and negative assembly to illumination of the proper intensity and duration to afford the proper photographic impression on the plate, as, for example, by means of a battery of arc lights (not shown).

In a simple and efficient construction, the exposure frame 11 comprises a desirably rectangular supporting framework 12 pivotally intermediately pivoted as by means of a pivot rod or shaft 13 (FIGURE 3) to and between opposing side walls of the supporting stand 10. At its end which during the exposure operation is uppermost, the supporting framework 12 has latch means to retain the exposure frame assembly selectively in a horizontal position and herein comprising a rigid depending bracket 14 carrying an inwardly projecting spring urged manually operable latch pin member 15 which is releasably engageable with a keeper bracket 17 suitably carried by the stand 10.

Marginally supported by a flange 18 of the supporting framework 12 is a vacuum platen 19 having on its upper or top surface a waffle grid pattern of scorings 20 (FIGURE 4) communicating with one or more vacuum fittings 21 having projection from the back face of the platen and connected to respective flexible duct or vacuum hose 22 leading from a shiftable suction device such as a vacuum pump (not shown). By virtue of the uniform suction thus afforded on the flat working face of the platen 19, a flexible sheet-like photo-sensitive printing plate 23 is adapted to be held firmly but manually removably upon the working face in perfectly flat plane against the platen. A thin negative 24 is superimposed upon the unexposed plate 23.

Figures 3, 4, 5:
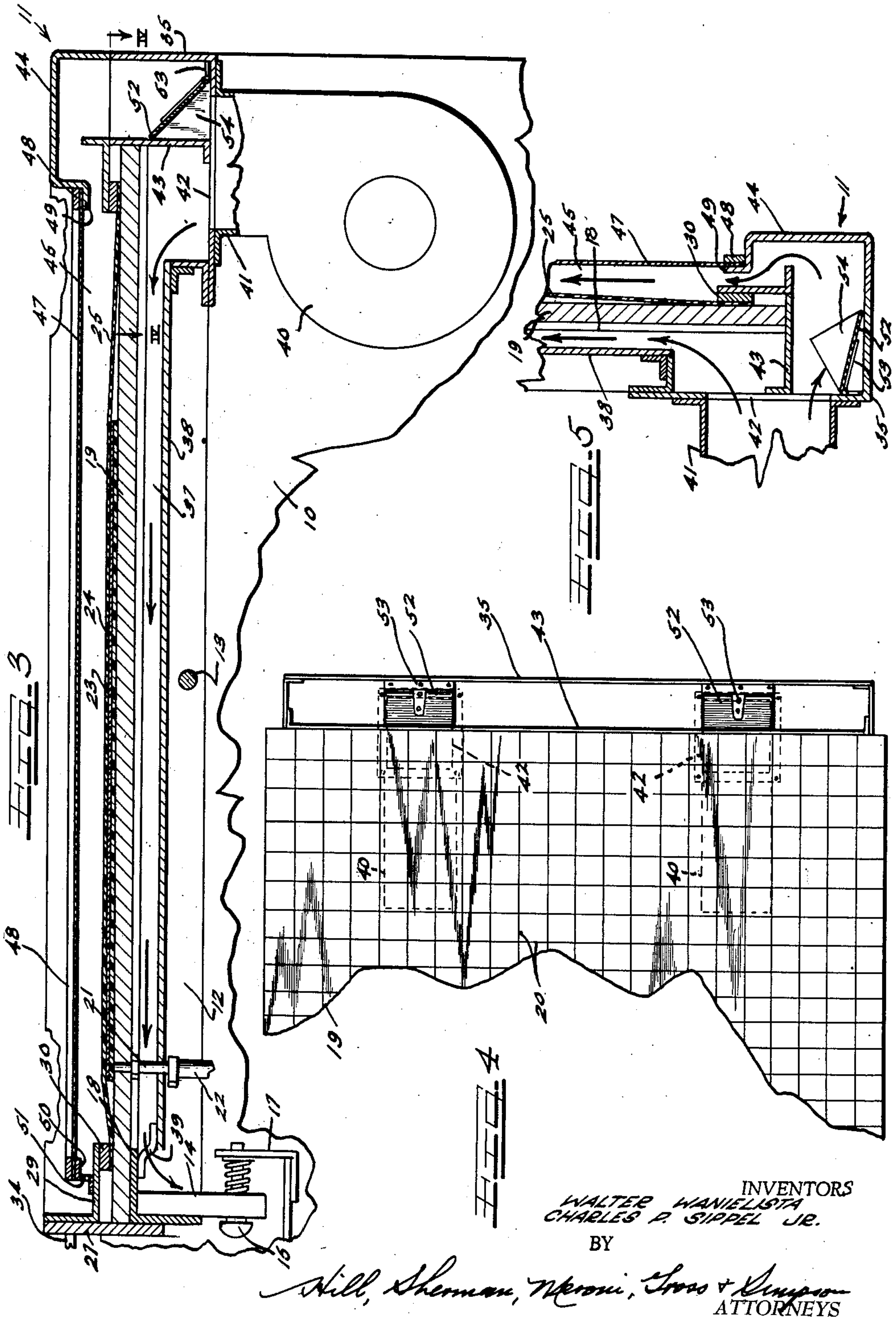
FIGURE 3 is an enlarged fragmentary vertical sectional detail view taken substantially on the line III—III of FIGURE 1.
FIGURE 4 is a fragmentary top plan view taken substantially on the line IV—IV of FIGURE 3.
FIGURE 5 is a fragmentary enlarged sectional detail view taken substantially on the line V—V of FIGURE 2.

In order to hold the negative 24 on the plate 23, a transparent hold down device is employed, comprising a separable thin, tough transparent plastic hold down blanket sheet 25 carried by a cover frame assembly 27. Since it is desirable to renew the transparent sheet 25 from time-to-time, it is supplied in a strip in roll form including supply and wind-up rolls 28 (FIGURES 1 and 2) mounted at opposite sides of the cover frame. This enables the sheet 25 to be stretched across a rectangular window defined by a flange 29 of the cover frame, with sponge rubber cushioning strip 30 interposed between the window flange and the hold down sheet (FIGURE 3).

At its read end, the cover frame 27 is suitably hingedly attached as by hinge means 31 to the rear end portion of the supporting framework 12, and a toggle mechanism 32 including a manipulating handle 33 is provided at the sides of the cover frame for swinging the cover assembly into open position as shown in dash outline in FIGURE 1 and into closed position as shown in full outline, wherein the toggle mechanism holds the cover assembly firmly closed with respect to the supporting frame 12 whereby to maintain the negative 24 firmly and in flat condition against the plate 23 by means of the hold down sheet 25. A handle 34 on the front end of the cover frame 27 is afforded to facilitate manipulation of the cover.

According to the present invention, means are provided for protectively cooling the platen 19 and the assembly supported thereby against damage from the heat to which subjected during exposure illumination. Such cooling is desirably effected by forceful circulation of cooling air past both faces of the platen 19. To this end, an air manifold 35 is provided across the end of the supporting frame 12 which during exposure is lowermost, or which may also be termed the rear end of the frame. This manifold partially underlies the platen 19 as best seen in FIGURE 3 and communicates with a shallow plenum space 37 afforded by an air duct structure 38 underlying in parallel relation the major portion of the back face of the platen 19 from the manifold to adjacent the inner end of the front end portion of the supporting flange 18, to which the front end of the duct 38 is secured in spaced relation by means such as spaced attachment bracket pieces 39 affording substantial air escape gap at the front end of the air circulation duct 38.

Cooling air is supplied to the manifold 35 under sufficient pressure to afford good air circulation, cooling velocity through the duct 38, by means suitably comprising a pair of blowers 40 (FIGURES 3 and 4) having discharge ducts 41 secured to the underside of the manifold 35 and discharging thereinto through respective ports 42. Thus, air blown from the blowers 40 into the manifold 35 passes from the manifold in an accelerated cooling stream layer through the plenum space 37 in cooling relation to the platen 19, substantially as indicated by the directional arrows in FIGURE 3.

In order to direct cooling air across the upper or working face of the platen 19, a partition 43 extends lengthwise within the manifold 35 along the rear end of the platen 19 and across the ports 42 whereby the air stream issuing through the ports 42 from the blowers 40 is adapted to be divided so that part of the air will pass from the open top of the rear end portion of the manifold 35 into a manifold channel 44 on the rear end portion of the cover frame 27, and past the rear end portion of the flange 29 and forwardly in cooling circulation over the working face of the platen 19 through a circulation plenum chamber 45 provided by the cover. For this purpose, a transparent window closure panel 47, which may comprise a sheet of thin, tough plastic sheet, is secured as by means of a window frame member 48 to a supporting flange 49 on the manifold extension 44 at the rear, and on an angular spacer member 50 at the front end attached to the front portion of the flange 29, with air escape openings 51 through the flange member 50.

In order to avoid wasting cooling air while the cover is open and also to avoid interference with removal and placement of printing plates and negatives on the platen 19 when the cover is open, means are provided to close the rear portion of the manifold 35 from the cooling air source when the exposure frame 11 is in the horizontal position, but to connect the rear portion of the manifold and the connecting circulation space 45 above the platen 19 with the air source in the upright or vertical position of the frame while the exposure process is taking place and the assembly on the platen subject to heating by the illumination source. Desirably, such means comprise automatically operable respective valve members 52 mounted in the rear portion of the manifold 35. Each of the valve members 52 is so constructed and arranged that it automatically by gravity moves between air port closing and open positions. For this purpose, each of the valve members 52 comprises a plate which is hingedly mounted by means of a hinge 53 adjacent to the rear side of the associated port 42 and of a length to extend diagonally toward the partition 43 against which the valve plate lies in closing position when the exposure frame 11 is disposed horizontally. In the closing position, respective triangular side flanges 54 on the plate portions of the valve members 52 afford side closures coacting with the partition 43 and the base wall of the manifold 35. In this closing position of the valve members 52, substantially all of the air from the blowers 40 is directed through the forward portions of the ports 42 into the circulation plenum space 37 on the back of the platen 19. This is desirable for continuing the cooling of the platen for removal of residual heat following an exposure operation.

By virtue of their hinged mounting rearwardly of the respective ports 42, and their upward projection, the valve members 52 readily overbalance and swing downwardly to open position then the exposure frame 11 is tilted into the vertical exposure position as shown in FIGURE 5, thus opening the associated rear portions of the ports 42 and effecting circulation of cooling air from the blowers 40 through the auxiliary manifold portion 44, and through the circulation plenum space 45 over the working face of the platen 19 in a generally intercepting relation to heat impinged onto the assembly during the exposure operation. Concurrently, of course, air continues to circulate across the back of the platen 19.

Since the valve members 52, due to their weight, drop with some force against the back wall defining the manifold 35, an audible concussion is effected which desirably advises the attendant that the valve members are in working order and have opened for cooling the working face of the platen and assuring that the benefits of the layer of protective cooling air are being had at the front of the platen.

While it is not as important to have an audible signal that the valves 52 have closed, nevertheless during the return movement of the frame 11 to horizontal position, dropping of the valves 52 into their closed position affords such a signal.

In the closed position of the valve members 52, their weight is sufficient to maintain them closed against the relatively low velocity, large volume discharge from the blowers 40, especially since a larger portion of the port 42 in each instance communicates with the circulation plenum space 37. If desired, of course, the blowers 40 may be operated at lower speed during horizontal positions of the frame 11 and at higher speed during vertical positions of the frame 11, which will further assure proper air shut-off, diverting action of the valve members 52 during horizontal dispositions of the frame.

It will be understood that modifications and variations may be effected without departing from the scope of the novel concepts of the present invention.

We claim as our invention:

1. In plate making apparatus of the character described,
means providing a supporting stand,
an exposure frame including a supporting framework,
a platen carried by the supporting framework,
means movably connecting the supporting framework to the stand for movement of the exposure frame between substantially horizontal loading position and an upright exposure position,
means effecting a vacuum condition on the surface of the platen which faces upwardly and provides a working face against which a plastic printing plate is held by the suction created by said vacuum means,
an openable cover structure carried by said supporting framework and including a transparent hold down sheet for retaining a negative flat against the plate,
transparent means carried by the cover structure defining with said hold down means an air plenum,
means defining an air plenum with the opposite face of the platen,
a manifold structure on said framework at one end of and communicating with said plenum on said opposite face of the platen,
means effecting communication between said manifold and said cover plenum,
means operative to drive cooling air into said manifold and thereby into said plenums,
and valve means automatically closing off air circulation to said cover plenum in the loading position of the frame and automatically opening the cover plenum to air circulation in the upright position of the frame.

2. In plate making apparatus of the character described,
means providing a supporting stand,
an exposure frame including a supporting framework,
a platen carried by the supporting framework,
means movably connecting the supporting framework to the stand for movement of the exposure frame between substantially horizontal loading position and an upright exposure position,
means effecting a vacuum condition on the surface of the platen which faces upwardly and provides a working face against which a plastic printing plate is held by the suction created by said vacuum means, an openable cover structure carried by said supporting framework and including a transparent hold down sheet for retaining a negative flat against the plate, transparent means carried by the cover structure defining with said hold down sheet an air plenum, means defining an air plenum with the opposite face of the platen, an air manifold on the framework, a partition dividing the manifold into two parts, a pair of blowers carried by the manifold and discharging into both of said manifold parts, one of said manifold parts communicating freely with the plenum at said opposite face of the platen, the other of said manifold parts communicating with the cover plenum, and gravity valve means controlling the communication of said blowers with said other manifold part to check the air supply in the loading position of the frame and to open said other part of the manifold to air supply from the blowers in the upright position of the frame.

3. Plate making apparatus as defined in claim 2, wherein said valve means strike a portion of the manifold audibly on opening when the frame is moved into the upright position in order to give assurance of functioning of the valve means.

4. Plate making apparatus as defined in claim 2, wherein the valve means strike against surfaces within the manifold both on opening and on closing of the valve means in order to give audible assurance of functional movements of the valve means.

5. In a plate making apparatus of the character described, means providing an exposure frame, a platen supported by the exposure frame and adapted to support on a working face thereof an assembly of a plate member and negative to be exposed, means separable relative to the platen for retaining the assembly on said working face, a blower having an outlet and separate passages communicating with the outlet, one of said passages being directed to cool both said working face and the assembly carried thereby and the other of said passages being directed for cooling the opposite face of the platen, to avoid overheating of the assembly, and valve means for controlling the communication of said outlet with said one passage.

6. In a plate making apparatus of the character described, means providing an exposure frame, a platen supported by the exposure frame and adapted to support on a working face thereof an assembly of a plate member and negative to be exposed, means separable relative to the platen for retaining the assembly on said working face, means mounting said frame for movement between substantially horizontal loading position and upright exposure position, a blower, means defining separate passages having a common connection with the blower, one of said passages being continuously operative through its connection with the blower to convey cooling air along the face of the platen opposite to said working face in both of said positions, the other of said passages directing air from the blower to cool said working face, and means for blocking entry of air into said other of said passages from the blower in the horizontal loading position of the frame and operative to open communication of said other passage with the blower in said upright exposure position for cooling of said working face.

7. Plate making apparatus as defined in claim 6, wherein said last mentioned means comprise gravity controlled valve structure automatically operative in the loading and exposure positions.

References Cited by the Examiner

UNITED STATES PATENTS 3,087,402 4/63 Hamlin ---------------- 95—73

EVON C. BLUNK, *Primary Examiner.*